April 9, 1957 R. N. EDWARDS 2,787,942
CAMERA
Filed May 17, 1954 3 Sheets-Sheet 2
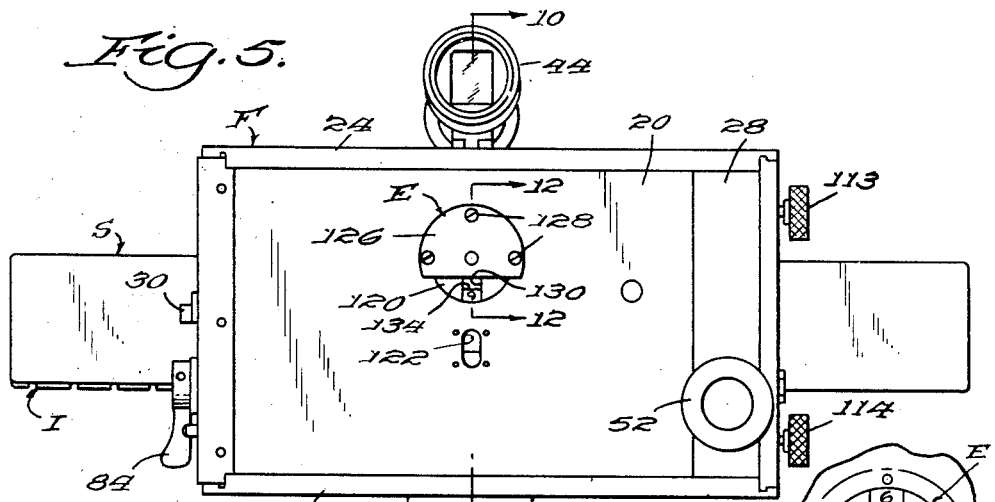
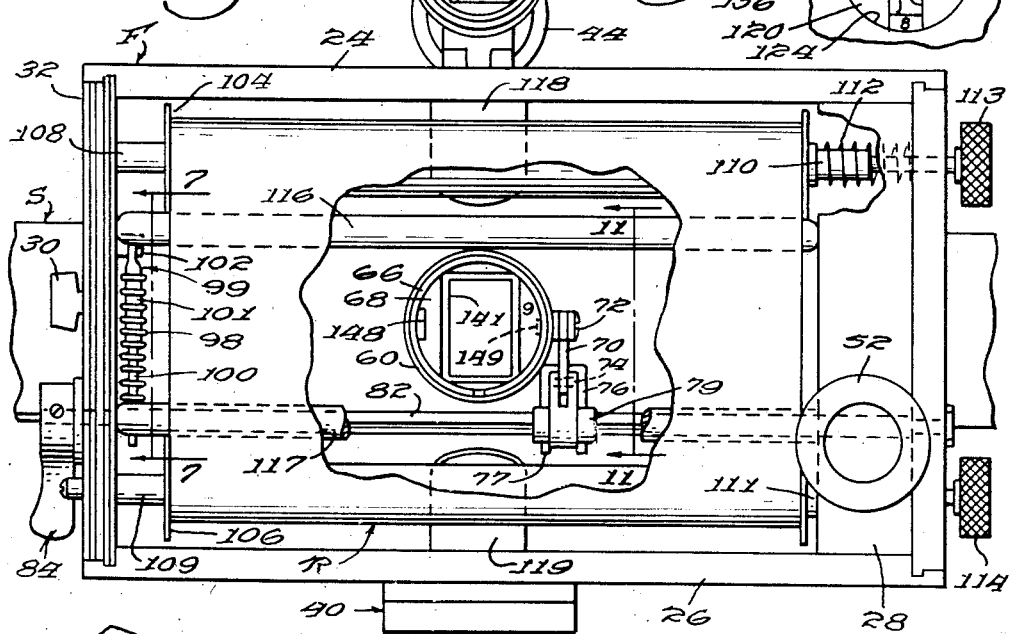
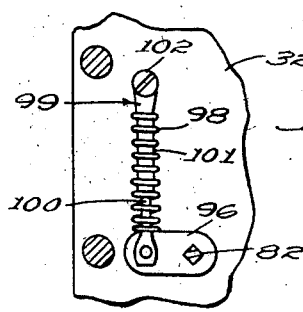
Inventor:
Robert N. Edwards.
By Francis A. Utecht Jr.
Atty.

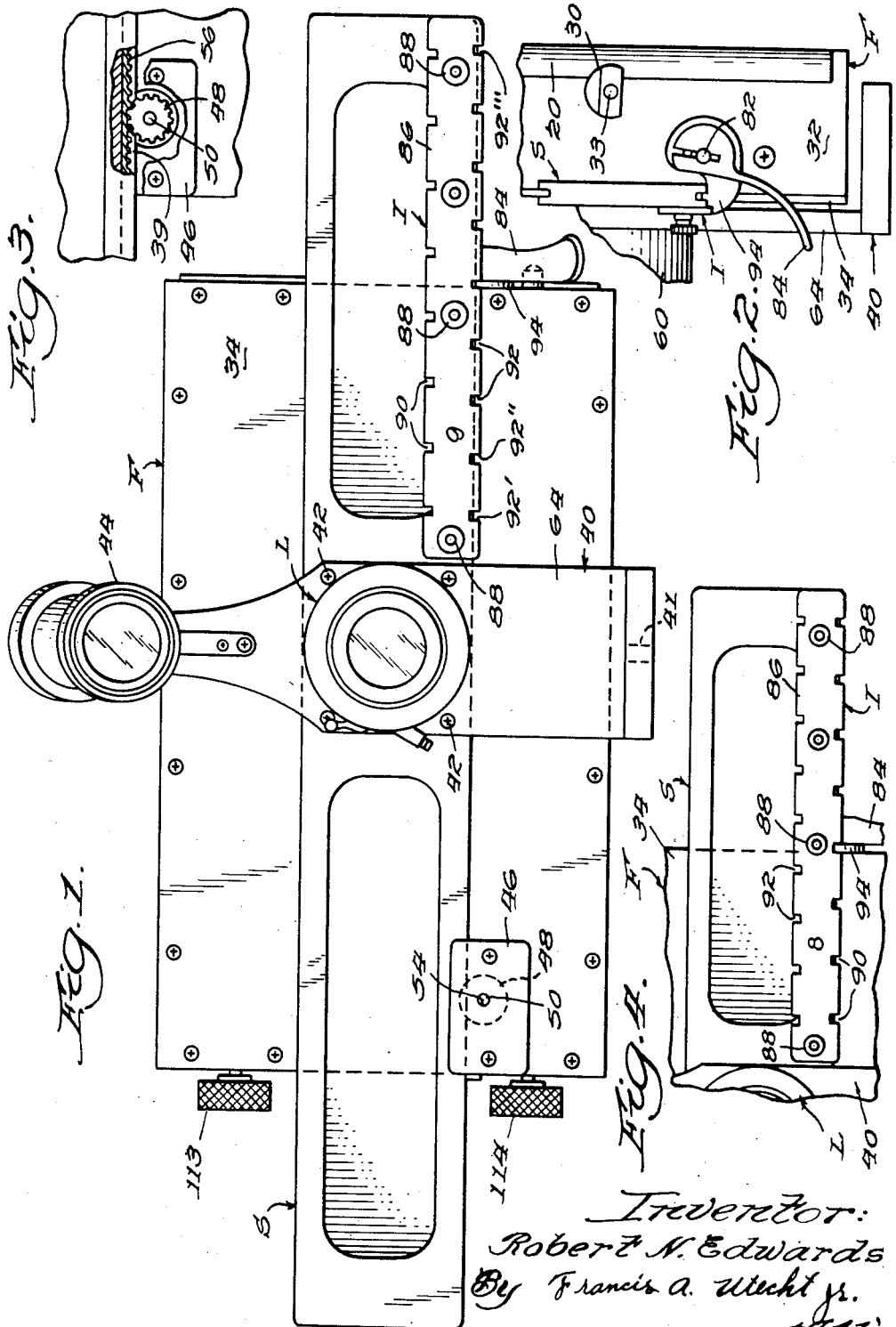

April 9, 1957 R. N. EDWARDS 2,787,942
CAMERA
Filed May 17, 1954 3 Sheets-Sheet 3
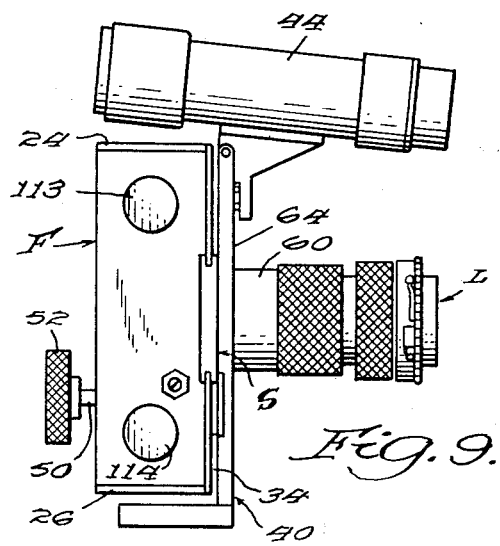
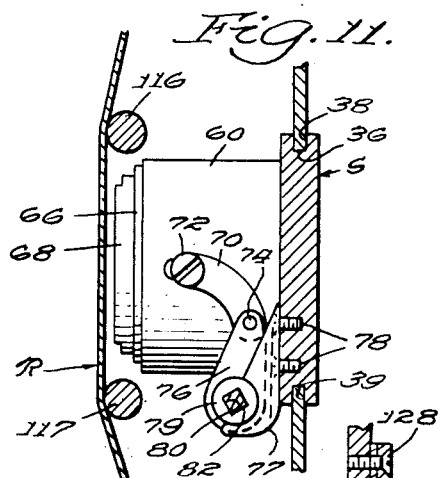
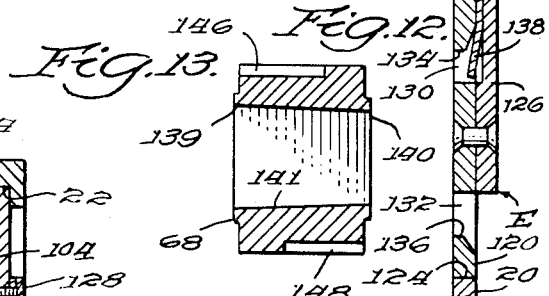
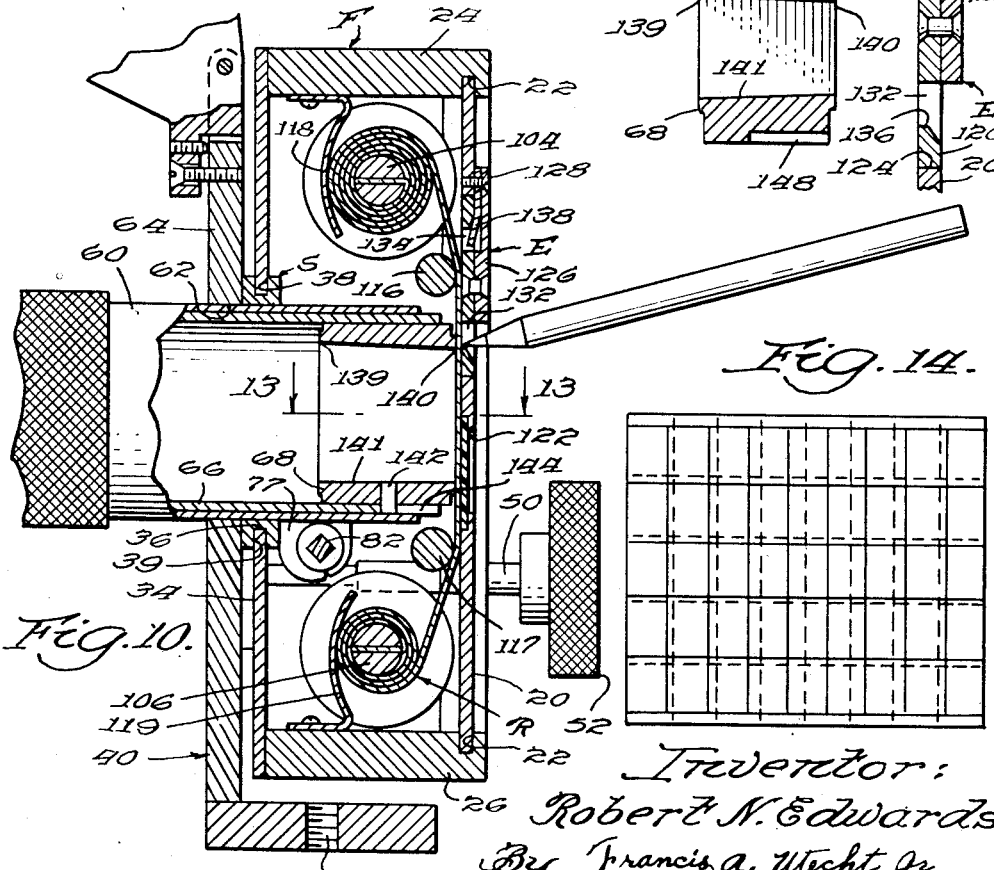
Inventor:
Robert N. Edwards
By Francis A. Wecht Jr.
Atty.

United States Patent Office 2,787,942
Patented Apr. 9, 1957

2,787,942
CAMERA
Robert N. Edwards, Glendale, Calif.
Application May 17, 1954, Serial No. 430,115
9 Claims. (Cl. 95—37)

The present invention relates generally to the field of still photography, and more particularly to an improved camera of the step-and-repeat type.

The step-and-repeat type camera is adapted to take a plurality of exposures in side-by-side relationship across the width of a film. Certain cameras of this type which have been heretofore proposed include a fixed support plate member that mounts a film housing member for relative horizontal movement. The support plate member is fixedly connected to a lens, and the film housing member incorporates means for supporting a roll of film. A lens tube extends away from the rear of the lens so as to direct light upon the film. After a row of exposures have been taken across the width of the film, a portion of the latter is unrolled so as to position an unexposed width of film behind the lens tube. The rear of the lens tube constantly remains in contact with the film even during relative movement therebetween. Accordingly, the film is often scratched by virtue of such contact.

It is one object of the present invention to provide a step-and-repeat camera incorporating novel means to prevent such inadvertent scratching of the film.

In taking pictures with a step-and-repeat camera it often becomes desirable to take a certain number of exposures of a given size across the width of the film roll on one part of the length thereof, and a smaller number of larger-sized exposures on another part of the length thereof. It is another object of the present invention to provide a step-and-repeat camera incorporating novel means for selectively obtaining such different-sized exposures.

A corollary object is to provide novel means for indicating to the photographer which portion of the length of the film roll is being exposed at any time.

Another object of the invention is to provide a camera of the aforedescribed nature which is comparatively simple in design and rugged of construction whereby it may afford a long and trouble-free service life.

An additional object of the invention is to provide a camera of the aforedescribed nature which is foolproof in operation whereby even a relatively unskilled photographer may obtain excellent results after a short period of instruction.

A further object is to provide a step-and-repeat camera of compact size and light weight whereby it may be readily transported from one location to another.

These and other objects and advantages of the present invention will become apparent from the following detailed description, when taken in conjunction with the appended drawings wherein:

Figure 1 is a front elevational view of a preferred form of camera, embodying the present invention;

Figure 2 is a fragmentary end view showing a detail of said camera;

Figure 3 is a vertical sectional view showing another detail of said camera;

Figure 4 is a fragmentary front elevational view of said camera with one of its parts re-arranged from its position of Figure 1;

Figure 5 is a reduced rear elevational view of said camera;

Figure 6 is another view taken from the rear of said camera with part of the latter being broken away in the interest of clarity;

Figure 7 is a fragmentary end view of a detail of said camera;

Figure 8 is an enlarged view of a detail in Figure 5;

Figure 9 is a reduced end view of said camera;

Figure 10 is an enlarged vertical sectional view taken on line 10—10 of Figure 5;

Figure 11 is an enlarged vertical sectional view taken on line 11—11 of Figure 6;

Figure 12 is an enlarged vertical sectional view taken on line 12—12 of Figure 5;

Figure 13 is a horizontal sectional view taken on line 13—13 of Figure 10; and,

Figure 14 is a diagrammatic view showing two exposure patterns which may be taken by said camera.

Referring now to the drawings, the preferred form of camera embodying the present invention includes a horizontally extending support plate member S which mounts a film housing member F for relative horizontal movement, the support plate member S being supported as by a fixed tripod or the like (not shown). The rear portion of the film housing member F mounts a roll of film R that may be unrolled vertically across its interior. The mid-portion of the support plate member S is formed with a lens and shutter mechanism L. An indexing mechanism I is interposed between the support plate member S and the film housing member F for controlling the horizontal spacing of exposures upon the film R. The rear of the film housing member F includes an exposure spacing unit E for controlling the vertical spacing of the exposures made upon the film R.

More particularly, the film housing member F is generally rectangular in shape having an open back that is adapted to be closed by a cover 20. The cover 20 is horizontally slidably retained within slots 22 formed in the top and bottom walls 24 and 26, respectively, of the film housing member. As indicated in Figure 5, the right side of the cover 20 abuts a vertically extending plate 28 which is rigidly mounted by the rear of the film housing member. The cover 20 is adapted to be secured in place by a lock element 30 that is rotatably affixed to one side wall 32 of the film housing member by a pin 33, as indicated in Figure 2. The front wall 34 of the film housing member F is formed with a horizontally extending elongated slot 36. As shown in Figure 10, this slot slidably receives upper and lower notches 38 and 39, respectively, of the support plate member S. The latter member includes a generally L-shaped mounting bracket 40 having a bore 41 for receiving the mounting bolt of a supporting tripod or the like. The support plate member S and the bracket 40 are rigidly secured together as by bolts 42. The upper end of the mounting bracket 40 mounts a conventional view finder 44.

Referring now to Figures 1 and 3, the left side of the front wall 34 of the film housing member mounts a metal case 46 for a pinion 48. This pinion 48 is keyed to a rearwardly extending shaft 50 having its rear end keyed to a hand wheel 52, as indicated in Figure 10. The front end of the shaft 50 is journaled in a bore 54 formed in the front wall of the case 46. The teeth of the pinion 48 are in engagement with the teeth of a rack element 56 that is rigidly secured within the confines of the guide element's lower notch 39. With this arrangement, manual rotation of the handwheel 52 will effect concurrent rotation of the pinion 48. Rotation of the pinion in turn will cause the film housing member F to move in a horizontal direction relative to the support plate member S.

As shown in Figure 10, lens and shutter mechanism L includes a fixed tube 60 that is rigidly supported within a bore 62 formed in the vertical wall 64 of the mounting bracket 40. A concentric lens tube 66 is slidably disposed within the fixed tube 60 for axial movement relative thereto. A light sealing cylinder 68 is removably secured within the rear portion of the lens tube 66. Referring now to Figures 6 and 11, one side of the lens tube 66 is pivotally connected to the upper end of a vertically extending curved link 70 by a pin 72. The lower end of this link 70 is pivotally secured by a pin 74 between the bifurcations of a vertically extending cross arm 76. The lower end of this cross arm 76 is integral formed with a bushing 79. The cross arm 76 is keyed against horizontal movement relative to the support plate member S by the sides of an anchor element 77 that is rigidly secured to the latter member by bolts 78 and which is of generally inverted U-shape, as shown in Figures 6 and 11. The bushing 79 is formed with a square-sided aperture 80. The latter slidably receives a horizontally extending rod 82. The ends of this rod 82 are rotatably journaled by the side walls of the film housing member F. As indicated in Figure 6, one end of the rod 82 is keyed to an actuating handle 84 disposed externally of the film housing member. With this arrangement, rotation of the rod 82 by means of the actuating handle 84 will effect concurrent rotation of the bushing 79, and rotation of the latter will be transferred by the cross arm 76 and the link 70 into axial movement of the lens tube 66 towards and away from the film R. In this manner the lens tube may be shifted from its normal position of Figure 10 to that of Figure 11. In its latter position the light sealing cylinder 68 is disposed forwardly of the film R. The desirability of effecting such shifting of the lens tube will become apparent hereinafter.

The front of the support plate member's guide element 38 mounts along one of its sides a horizontally extending indexing strip 86 forming a part of the indexing mechanism I. This strip 86 is removably secured to the guide element by means of a plurality of bolt and nut combinations 88. The upper edge of the indexing strip is formed with a plurality of horizontally-spaced notches 90. The lower edge thereof is likewise formed with a plurality of horizontally-spaced notches 92, however, the lower notches are spaced more closely together than the upper notches. Both sets of notches are adapted to cooperate with a latch element 94 formed upon the actuating handle 84 to lock the film housing member F against movement relative to the support plate member S. Referring now to Figures 2, 6 and 7, it should be particularly noted that the free end of the latch element 94 is constantly biased upwardly toward the indexing strip 86. To this end, a short rearwardly extending finger 96 shown in Figure 7 is locked to the square-sided rod 82. The free end of this finger 96 is constantly biased downwardly by a helical compression spring 98. The latter is carried upon an elongated spring carrier 99 having a lower element 100 that is pivotally connected to the free end of the finger 96 and an upper element 101 that pivotally affixed to the interior one of the side walls of the film housing member F by a pin 102, the two elements 100 and 101 being of a telescoping nature.

The roll of film R is supported between an upper spool 104 and a lower spool 106 that are carried at their left ends by stubs 108 and 109 formed on the left side wall of the film housing member F, and at their right ends by short shafts 110 and 111 journaled by the right side wall of the film housing member F. Helical compression springs 112 constantly bias the stub shafts 110 and 111 away from the right side wall. With this arrangement the spools 104 and 106 may be positioned between the stubs 108 and 109 and the shafts 110 and 111. Rotation of the latter shafts is adapted to be effected by means of knurled control wheels 113 and 114 which are keyed to shafts 110 and 111, respectively, exteriorly of the film housing member. The portion of film between the upper and lower rollers which passes behind the light sealing cylinder 68 is caused to follow a straight vertical path by a pair of elongated horizontally extending, vertically spaced guides 116 and 117. Upper and lower rearwardly curved pressure spring fingers 118 and 119 serve to maintain the film at the proper tension on the spools 104 and 106.

The exposure spacing unit E is disposed on the film housing cover 20 and includes a marking disc 120 and a viewing aperture 122. Referring to Figures 5, 8 and 10, the marking disc 120 is rotatably disposed within a circular aperture 124, formed in the cover 20. The major portion of the disc's diameter is enclosed within a shielding element 126 that is rigidly affixed to the cover as by screws 128. The disc 120 is formed with a first opening 130 and with a second similar opening 132 that is spaced diametrically opposite opening 130. The radially inner ends of openings 130 and 132 define straight-sided marking surfaces 134 and 136, respectively, for a purpose to be described hereinafter. It should be particularly noted that the marking surface 134 is spaced radially outwardly a greater distance than the other marking surface 136. As shown in Figure 12, a downwardly extending spring finger 138 is interposed between the upper end of the shielding element 126 and the cover 20. The lower portion of this spring finger 138 extends forwardly so as to project into the first opening 130 of the marking disc 120.

Referring now to Figures 6, 10 and 13 for a detailed showing of the light sealing cylinder 68, it will be seen that it is formed at one of its ends with an aperture 139 of one size and at its opposite end with a smaller aperture 140. These apertures are connected by a trapizoidal passage 141 that is adapted to transmit light from the lens tube 66 onto the film R. The lower sidewall of this cylinder rigidly mounts a depending guide pin 142 which is slidably received by a slot 144 formed in the rear portion of the lens tube 66. As shown in Figure 13, one sidewall of the light sealing cylinder 68 is formed with an axially extending notch 146, while the opposite sidewall is formed with a similar notch 148. These notches provide clearance for a nut 149 that is secured to the pin 72, as shown in Figure 6.

In the operation of the preferred form of camera embodying the invention, the cover 20 is removed from the rear of the film housing member F and a roll of film R is mounted therein. Assuming that nine exposures are to be made across the width of the film roll the light sealing cylinder 68 will be disposed in its position of Figure 10 with its smaller aperture 140 arranged adjacent the rear end of the film housing member. Additionally, the indexing strip 86 will be arranged in its position of Figure 1 with the closer-spaced notches 92 disposed at the bottom whereby they may be engaged by the latch element 94 of the actuating handle 84. Further, the marking disc 120 will be disposed in its position of Figure 5 with the opening 130 exposed to view below the shielding element 126. The handwheel 52 may then be rotated so as to move the film housing member F relative to the support plate member S until the latch element 94 snaps into the left-hand notch 92'. The first exposure may then be taken.

Next, the free end of the actuating handle 84 will be urged rearwardly so as to withdraw latch element 94 from notch 92', and handwheel 52 is rotated so as to move the film housing member F to the left relative to the support plate member S. Once such movement is initiated the operator may release the actuating handle 84. This movement of the film housing member will continue until the latch element 94 snaps into the next notch 92''. At this time the next exposure may be taken.

It should be particularly noted that rearward movement of the free end of the actuating handle 84 will effect concurrent forward movement of the lens tube 66 and hence the light sealing cylinder 68, accordingly, the rear end of the latter will be pulled away from the film whereby no scratching thereof can take place during relative movement of the film and the cylinder. This process is repeated until seven more exposures have been taken and the latch element 94 is disposed in the right hand notch 92′′′. At this time a pencil may be utilized to mark the rear of the film R along the marking surface 134. The roll of film will then be rolled downwardly until this pencil mark is visible in the center of the viewing aperture 122. In this manner proper vertical spacing of the rows of exposures may be obtained.

Assuming now that eight exposures, rather than nine are to be made across the width of the film R, the light sealing cylinder 68 will be withdrawn from the rear of the lens tube 66 and re-inserted therein with its larger aperture 139 arranged adjacent the rear end of the film housing member. The nut elements of the bolt and nut combinations 88 will be unscrewed in order that the indexing strip 86 may be inverted whereby the notches 90 may be engaged by the latch element 94, as shown in Figure 4. Finally, the marking disc 120 will be rotated 180 degrees so as to dispose the opening 132 exposed to view below the shielding element 126, as shown in Figure 8. This may be accomplished with the cover 20 removed by forcing the lower portion of the spring finger 138 rearwardly, said finger serving to lock the disc against rotation. The camera will then be arranged for taking eight exposures across the roll of film R. The relationship between the two sizes of exposures will be made clear by reference to Figure 14 wherein a strip of film is shown marked in solid lines for a nine-exposure pattern and in dotted lines for an eight-exposure pattern.

While there has been shown and described herein what is presently considered to be the preferred embodiment of the present invention, it will be apparent that various modifications and changes may be made therein without departing from the spiirt of the invention or the scope of the following claims.

I claim:

1. A camera for taking a certain number of exposures of a first size in side-by-side relationship across the width of one portion of a film and of a second size across the width of another portion of said film, comprising: a horizontally extending fixed support plate member; a film housing member slidably carried by said support plate member for horizontal movement relative thereto, the rear portion of the latter having means for supporting said film; a tube extending rearwardly from said lens supporting means; a light sealing cylinder axially slidably disposed in the rear portion of said tube with its rear end normally being in contact with said film; an indexing strip formed along its upper edge with a plurality of horizontally spaced notches corresponding to said first size of exposure and along its lower edge with a plurality of horizontally spaced notches corresponding to said second size of exposure; a latch element adapted to be successively engaged with one of said plurality of notches; means for releasably securing said indexing strip to said support plate member with one of said plurality of notches in position to be engaged by said latch element; a horizontally extending rod mounted by said film housing member and connected to said latch element whereby movement of said rod will effect withdrawal of said latch element from said notches; and, means operatively interposed between said rod and said light sealing cylinder for moving the latter forwardly away from said film as said latch element is withdrawn from said notches.

2. A camera as set forth in claim 1 which includes spring means interposed between said film housing member and said rod for normally biasing it in a direction to urge said light sealing cylinder rearwardly toward said film and said latch element into engagement with said notches.

3. A camera for taking a certain number of exposures of a first size in side-by-side relationship across the width of one portion of a film and of a second size across the width of another portion of said film, comprising: a horizontally extending fixed support plate member; a film housing member slidably carried by said support plate member for horizontal movement relative thereto, the rear portion of the latter having means for supporting said film; a tube extending rearwardly from said lens supporting means; a light sealing cylinder axially slidably disposed in the rear portion of said tube with its rear end normally being in contact with said film, said light sealing cylinder being selectively reversibly disposed within said tube and being formed at one of its ends with an aperture corresponding to said first size of exposure and at its opposite end with an aperture corresponding to said second size of exposure; an indexing strip formed along its upper edge with a plurality of horizontally spaced notches corresponding to said first size of exposure and along its lower edge with a plurality of horizontally spaced notches corresponding to said second size of exposure; a latch element adapted to be successively engaged with one of said plurality of notches; means for releasably securing said indexing strip to said support plate member with one of said plurality of notches in position to be engaged by said latch element; a horizontally extending rod mounted by said film housing member and connected to said latch element whereby movement of said rod will effect withdrawal of said latch element from said notches; and, means operatively interposed between said rod and said light sealing cylinder for moving the latter forwardly away from said film as said latch element is withdrawn from said notches.

4. A camera as set forth in claim 3 which includes spring means interposed between said film housing member and said rod for normally biasing it in a direction to urge said light sealing cylinder rearwardly toward said film and said latch element into engagement with said notches.

5. A camera for taking a certain number of exposures of a first size in side-by-side relationship across the width of one portion of a film and of a second size across the width of another portion of said film, comprising: a horizontally extending fixed support plate member; a film housing member slidably carried by said support plate member for horizontal movement relative thereto, the rear portion of the latter having means for supporting said film; a tube extending rearwardly from said lens supporting means; a light sealing cylinder axially slidably disposed in the rear portion of said tube with its rear end normally being in contact with said film; an indexing strip formed along its upper edge with a plurality of horizontally spaced notches corresponding to said first size of exposure and along its lower edge with a plurality of horizontally spaced notches corresponding to said second size of exposure; a latch element adapted to be successively engaged with one of said plurality of notches; means for releasably securing said indexing strip to said support plate member with one of said plurality of notches in position to be engaged by said latch element; a horizontally extending rod mounted by said film housing member and connected to said latch element whereby movement of said rod will effect withdrawal of said latch element from said notches; means operatively interposed between said rod and said light sealing cylinder for moving the latter forwardly away from said film as said latch element is withdrawn from said notches; and, a marking disc rotatably supported by the rear wall of said film housing member, said disc being formed with first and second marking surfaces formed on different radii thereof, said rear wall also being formed with a viewing aperture which is in vertical alignment with said marking disc.

6. A camera as set forth in claim 5 where said light sealing cylinder is selectively reversibly disposable within said lens tube and is formed at one of its ends with an aperture corresponding to said first size of exposure and at its opposite end with an aperture corresponding to said second size of exposure.

7. A camera as set forth in claim 6 which includes spring means interposed between said film housing member and said rod for normally biasing it in a direction to urge said light sealing cylinder rearwardly toward said film and said latch element into engagement with said notches.

8. A camera as set forth in claim 7 where the rear wall of said film housing member is formed with a shielding element over said marking disc which permits only one of said marking surfaces to be viewed at a time.

9. A camera for taking a certain number of exposures of a first size in side-by-side relationship across the width of one portion of a film and of a second size across the width of another portion of said film, comprising: a horizontally extending fixed support plate member; a film housing member slidably carried by said support plate member for horizontal movement relative thereto, the rear portion of the latter having means for supporting said film; an indexing strip formed along its upper edge with a plurality of horizontally spaced notches corresponding to said first size of exposure and along its lower edge with a plurality of horizontally spaced notches corresponding to said second size of exposure; a fixed tube rigidly extending rearwardly from the front portion of said support plate member; a concentric lens tube slidably disposed within said fixed tube for axial movement relative thereto; a light sealing cylinder selectively reversably disposed within the rear portion of said lens tube, said cylinder being formed at one of its ends with an aperture corresponding to said first size of exposure and at its opposite end with an aperture corresponding to said second size of exposure, said apertures being connected by a trapizoidal passage; a curved link pivotally connected at its upper end to one side of said lens tube; a vertically extending cross arm pivotally connected at its upper end to the lower end of said link and formed at its lower end with a bushing having a square-sided horizontal aperture; an anchor element secured to said support plate member and abutting said cross arm so as to key it against horizontal movement relative to said support plate member; a horizontally extending square-sided rod slidably received by the aperture of said bushing and having its ends journaled by said film housing member; an actuating handle keyed to one end of said rod exteriorly of said film housing member; a latch element integrally extending from said handle and adapted to be successively engaged with the notches of said indexing strip, rotation of said handle effecting movement of said latch element out of said notches; means for releasably securing said indexing strip to said support plate member with one of said plurality of notches in position to be engaged by said latch element; a finger rigidly extending from said rod; a spring carrier interposed between the free end of said finger and said film housing member; and a helical compression spring disposed on said carrier for constantly biasing said rod in a direction to urge said lens tube rearwardly and said latch element into engagement with said notches.

References Cited in the file of this patent

UNITED STATES PATENTS

| | | |
|---|---|---|
| 1,991,578 | Rixen | Feb. 19, 1935 |
| 2,170,583 | Thompson | Aug. 22, 1939 |
| 2,335,697 | Reyniers | Nov. 30, 1943 |
| 2,356,363 | Thompson | Aug. 22, 1944 |
| 2,369,981 | Reyniers | Feb. 20, 1945 |
| 2,497,358 | Huntzinger | Feb. 14, 1950 |